United States Patent Office 3,429,843
Patented Feb. 25, 1969

3,429,843
HOT MELT ADHESIVES CONTAINING DI-
METHYL ALPHA-METHYL STYRENE/
ALPHA-METHYL STYRENE/STYRENE
TERPOLYMERS
Vernon W. Arnold, Hammond, Ind., and Robert J. Lee,
Dolton, Ill., assignors to Standard Oil Company, Chicago, Ill., a corporation of Indiana
No Drawing. Continuation-in-part of application Ser. No. 580,168, Sept. 19, 1966. This application May 19, 1967, Ser. No. 639,630
U.S. Cl. 260—28.5      6 Claims
Int. Cl. C08f 29/36, 33/08, 45/52

ABSTRACT OF THE DISCLOSURE

Terpolymers of dimethyl alpha-methyl styrene, alpha-methyl styrene and styrene are used in the formulation of hot melt adhesives and paper coatings.

---

This application is a continuation-in-part of our co-pending application S.N. 580,168, filed Sept. 19, 1966. This invention pertains to a thermoplastic resin made with dimethyl alpha-methyl styrene and a novel, hot melt, adhesive composition made from such resin.

More particularly, our invention relates to hot melt adhesives and hot melt coatings of the sort made by combining paraffin wax, ethylene/unsaturated ester copolymers, and a thermoplastic resin. Suitable thermoplastic resins which contribute hot tack property to hot melt formulations are known to the art, such as the alpha-methyl styrene/vinyl toluene copolymers described in U.S. Patent 3,245,931. Among other materials which have been used to contribute hot tack property to hot melt adhesive and coating formulations are rosin derivatives and beta-pinene-type resins, though these natural materials have been substantially displaced by the recently developed synthetic copolymers.

We have found that a resin prepared from dimethyl alpha-methyl styrene can be used in hot melt formulations as a replacement for resins known to the art and that such resins provide enhanced processability during compounding. This is evidenced by the good compatibility of dimethyl alpha-methyl styrene resins with the other components of hot melt formulations. Further, our novel resins have a lower viscosity at processing temperatures than many of the alternative compounds heretofore known to this art and often have an improved color or, at the least, a reduced opacity, as well as lowered cloud points when mixed in coating blends.

The resins suitable for the practice of our invention are those which have ring and ball softening points from about 150° F. to about 325° F., the resins of softening points higher than the latter value being undesirably difficult to solubilize in the hot melt compositions for which they are intended. We find resins of softening points from 175 to 270° F. to be desirable and prefer those of softening points from 200 to 270° F.

The resins of our invention can be readily produced by catalytic polymerization of dimethyl alpha-methyl styrene, alpha-methyl styrene and styrene with $BF_3$, $BF_3$ complexes, aluminum chloride, and similar Friedel-Crafts type acidic catalysts. The softening point and molecular weight of the resins can be readily controlled by varying the temperature at which the monomer mixture is contacted with the catalyst and by varying the ratio of catalyst to monomers according to techniques known to the art. Lower temperatures produce resins of higher softening points and higher molecular weights. Higher temperatures produce resins of relatively lower softening points and lower molecular weights. Polymerization is conveniently carried out at a temperature within the range of about 0° F. to −70° F. and in an inert organic solvent.

As stated, the monomers used in the production of the resins of our invention are dimethyl alpha-methyl styrene, alpha-methyl styrene and styrene. The dimethyl alpha-methyl styrene isomers useful in our invention are the 2,3-, the 2,4-, the 2,5-, the 2,6-, the 3,4- and the 3,5- dimethyl alpha-methyl styrenes. We have found that the resins made from the 3,4-isomer generally have the best solubility and that this monomer generally can be produced most easily in the highest yields. The 3,5-isomer resins have been found, generally, not to be completely soluble in kerosene and n-heptane, though these have reasonably good solubility in various other organic solvents. The 2,3-, 2,4-, 2,5- and 2,6-isomers are not preferred for the practice of our invention because these isomers are difficult to produce in good yields and high purities. Hence, the 3,4-dimethyl alpha-methyl styrene is the preferred isomer for the practice of our invention. As will be evident to those skilled in the art, a mixture of dimethyl alpha-methyl styrene isomers, containing the 3,4-isomer, can be satisfactorily employed for the practice of our invention. For the purposes of simplicity, our invention will be exemplified hereinbelow with reference to the 3,4-dimethyl alpha-methyl styrene, but it is to be understood that other isomers can be used in the practice of our invention, with the precaution that the 3,5-isomer may lead to resins having less solubility than desirable for some applications. The alpha-methyl styrene and styrene monomers useful in the practice of our invention are well known to those skilled in the art.

In the preparation of the terpolymers of our invention, we find that about a 1:1:1 mol ratio of the three monomers dimethyl alpha-methyl styrene, alpha-methyl styrene and styrene provides useful products. The mixture of monomers may consist of from about 10 to about 70 mol percent of each monomer.

The preparation of resins of our invention has been accomplished according to the technique described hereinabove which is set forth in greater detail hereinbelow. Production of our novel resins can be performed in batch or continuous operations, with the continuous process being preferred as a matter of convenience. Various inert organic solvents can be used in the polymerization processes and these provide a ready means for facilitating control of the temperatures and reaction rates of our processes. Among suitable inert organic solvents are those liquid at the temperature of reaction, such as cumene, heptanes, hexanes, toluene, xylene and the like.

PREPARATION OF TERPOLYMER RESINS

The terpolymer resins of our invention can be made by polymerization, preferably carried out in a solution containing about 20 percent by weight of mixed monomers in an inert solvent such as cumene. If the monomers and solvent are not dry, the solution for polymerization can be dried by percolation through calcium chloride or by other means known to the art. The polymerization feed can then be cooled to a desired inlet temperature and pumped into a tube-type reactor, with gaseous $BF_3$ being metered into the feed as it enters the reactor. Solvent and catalyst can be removed from the resin by distillation techniques well known to the art. More specifically, we have found that in the production of a resin having a softening point in the range 240–250° F., a polymerization temperature of −30 to −70° F. is advantageous when a $BF_3$ catalyst concentration of 0.03 to 0.3 weight percent is used, based on the weight of the total solution.

We have found that it is desirable, in general, to charge a 20 percent concentration of the monomer mixture in an inert hydrocarbon solvent to a tube reactor at an intial temperature in the range of 0 to −70° F. with from about 0.03 to about 0.3 weight percent of BF₃, based on the weight of the total solution.

The properties of some typical resins prepared in accordance with our invention are compared in Table I to properties of a commercially available tackifier, an alpha-methyl styrene/vinyl toluene copolymer available commercially as Piccotex 120.

TABLE I.—PROPERTIES OF TYPICAL TERPOLYMERS COMPARED TO COMMERCIAL ALPHA-METHYL STYRENE/VINYL TOLUENE COPOLYMER

| Resin | Mol Ratio Components [1] | Softening Point °F | Molecular Weight | Color [2] | Viscosity [3] |
|---|---|---|---|---|---|
| A | 1/1/1 | 244 | 911 | <1 | C-D |
| B | 1/1/0.75 | 264 | 1,138 | <1 | F |
| C | 1/1/0.50 | 269 | 1,219 | <1 | H-I |
| D | 1/1/0.25 | 280 | 1,419 | <1 | J |
| E | Piccotex 120 [4] | 248 | 1,568 | 1 | F-G |

[1] Alpha-methyl styrene/styrene/dimethyl alpha-methyl styrene.
[2] Gardner color, 50% in toluene.
[3] Gardner-Holt viscosity, 60% in toluene.
[4] Alpha-methyl styrene/vinyl toluene.

Resins A, B, C, and D of Table I were all produced using the same polymerization conditions and at a reactor inlet temperature of −51° F. The softening point and solution viscosity of the terpolymer resins are reduced as the proportion of dimethyl alpha-methyl styrene is increased. The softening point can be raised or lowered as desired by lowering or raising the polymerization temperature.

The hot melt compositions of our invention can be conveniently made by combining a dimethyl alpha-methyl styrene terpolymer resin with a paraffin wax and an ethylene/unsaturated ester copolymer. The amount of any one of the three components in the mixture can range from as little as about 5 percent by weight of the mixture to as much as 80 percent or more by weight of the total mixture. In hot melt adhesives, where the cost of material is not as significant as in hot melt coatings, the paraffin wax can be omitted. We prefer a component range of 10 to 80 percent.

The paraffin waxes suitable for the practice of our invention are those known to the art having a melting point within the range of about 125 to about 200° F. Exemplary of such waxes are the Eskar R-Waxes of the American Oil Company, such as R-40, a paraffin wax having a melting point of 136.4° F. and a blocking point of 105° F., R-50 paraffin wax having a melting point of 152.2° F. and a blocking point of 115° F. and MW-65, a microcrystalline wax having a melting point of 166.8° F.

The ethylene-unsaturated ester copolymers useful in the practice of our invention are such as ethylene-vinyl acetate, ethylene-ethyl acrylate, ethylene-isobutyl acrylate and the like. The ethylene copolymers suitable in the practice of our invention are those having a mol ratio of ethylene to ester monomer within the range of 90:10 to 50:50 and preferably within the range of 80:20 to 60:40, with a melt index within the range of 1 to 150 or more, desirably from 1.5 to 30 and preferably from 1.5 to 5. Suitable commercially available ethylene copolymers are such as the Du Pont Elvax vinyl resins Nos. 150, 260, 360 and 460 containing from seventeen to thirty-four percent vinyl acetate, the Dow Zetafax resins Nos. 1070, 1170, 1270, 1370 and 1570 containing from eighteen to thirty-two percent of ethyl or isobutyl acrylate and Union Carbide's Co-Mer resins Nos. 308 and 508 containing twenty to twenty-eight percent vinyl acetate.

The individual ingredients may be combined in various proportions to make hot melt compositions and the choice of proportions is selected according to the properties desired. For example, a hot melt composition useful as an adhesive will desirably contain relatively small amounts of petroleum wax as compared to a hot melt composition intended as a paper coating. Generally, the adhesive compositions should contain from about 5 percent or less of petroleum wax to about 60 percent, while the coating compositions may contain from as much as 90 percent or more of wax to as little as 35 percent, all by weight.

The preparation of a hot melt formulation of our invention can be performed as follows: into about 1 part of paraffin wax, at a temperature of 300° F., in a two-liter, stainless steel kettle, fitted with an agitator, there is added 1 part by weight of an ethylene-vinyl acetate copolymer (Elvax 260 containing 28 percent vinyl acetate) and about 1 part by weight of a dimethyl alpha-methyl styrene terpolymer resin having a ring and ball softening point of about 250° F. This mixture is held at 300° F., with agitation, until the components appear to be dissolved and a clear and smooth blend is obtained. This blend is suitable for use as a hot melt coating or adhesive, as set forth below. Mixing can be performed conveniently at temperatures within the range of just high enough to melt all the components up to the decomposition temperature of any component. The usual antioxidants known to this art, such as butylated hydroxy toluene, may be added in small amounts sufficient for stabilization against oxidative degradation.

To demonstrate the blend compatability of the terpolymers of our invention, two terpolymers of different compositions were blended with different waxes and ethylene copolymers to make blends typical of those used as paper coatings.

One resin, designated for purposes hereof Sample F, contained alpha-methyl styrene/styrene/dimethyl alpha-methyl styrene in mol ratios of 1/1/0.75. A second, designated Sample G, contained the same components in mol ratios of 1/1/1, respectively. Cloud point of the blends was used as a measure of compatability.

Cloud point was determined according to the following procedure. Approximately 300 ml. glycerine was placed in a 600 ml. beaker and heated on a hot plate to 400° F. A Pyrex test tube (25 x 150 mm.) containing a 100 g. sample of the blend to be tested was supported in the bath and stirred occasionally with the thermometer until a clear homogeneous solution was obtained. The test tube was then removed from the bath and wiped clean of glycerine. The test sample was allowed to cool with slow, constant stirring while positioned in front of a constant fluorescent light source. The cloud point for a test sample was reported as the point where the image of the light passing through a cross-section of the test tube disappeared. An average of three such readings was used to obtain the values listed hereinbelow.

Blends were made with Sample F and Sample G which contained 60 percent by weight of wax, 20 percent by weight of ethylene copolymer and 20 percent by weight of the ternary resins. Table II sets forth the nature of the blends and the resulting cloud points.

TABLE II.—CLOUD POINTS OF HOT MELT COATING BLENDS

| Blend | Resin | Wax | Ethylene copolymer | Cloud point, °F. |
|---|---|---|---|---|
| 1 | F | R-50 paraffin | Elvax 460 | 341 |
| 2 | G | do | do | 290 |
| 3 | F | R-40 paraffin | Zetafax 1270 | 390 |
| 4 | G | do | do | 345 |
| 5 | F | MW-65 microwax | Co-Mer 508 | 345 |
| 6 | G | do | do | 291 |

In each pair of results where the blends were comparable excepting for the amounts of dimethyl alpha-methyl styrene in the terpolymer, that blend containing the terpolymer of higher dimethyl alpha-methyl styrene content showed better compatability by its lower cloud point.

In order to demonstrate the usefulness of the hot melt formulations of our invention, paper coatings were performed using compositions made in accordance with the invention and were compared to results obtained in paper coating with a composition known to the art. The paper coatings were performed on a Dusenbery Roll Coater with the melt tank maintained about 300° F. and the pick-up roll and doctor blade maintained near that temperature. The chilled rolls were maintained at about 50° F.

The blends in accordance with our invention prepared for testing were made up of about 51.9 percent by weight American Oil Eskar R–50 paraffin wax, 30.0 percent by weight Elvax 260 (a Du Pont ethylene-vinyl acetate copolymer containing 27 to 29 percent vinyl acetate and having a melt index in the range of 5 through 7), 0.1 percent by weight 2,6-di-tertiary butyl p-cresol antioxidant and 18.0 percent by weight of a terpolymer resin. The blend made in accordance with the prior art contained the same ingredients excepting for the substitution of Piccotex 120 (an alpha-methyl styrene/vinyl toluene copolymer) for the terpolymer resin. Some properties of the resins are set forth in Table III. Details of the paper coating and test results are presented in Table IV.

TABLE III.—SELECTED PROPERTIES OF TERPOLYMER RESINS

| Resin | Mol ratio Components [1] | Softening point, °F. | Color |
|---|---|---|---|
| H | 1/1/0.75 | 264 | <1 |
| I | 1/1/1 | 250 | <1 |
| J | 1/1/1 | 244 | <1 |

[1] Alpha-methyl styrene/styrene/dimethyl alpha-methyl styrene.

TABLE IV.—HOT-MELT PAPER COATING EVALUATIONS OF BLENDS MADE WITH VARIOUS RESINS

| Resin | H | H | I | J | Piccotex 120 |
|---|---|---|---|---|---|
| Substrate paper type | [1] 25# | [2] 25# | [2] 25# | [2] 30# | [2] 25# |
| Coating weight (pounds/ream) | 9–11 | 9–11 | 9–11 | 9–11 | 9–11 |
| Pick point (Tappi T652) | 115.0 | 103.0 | 112.0 | 110.5 | 112.5 |
| Block point (Tappi T652) | 124.5 | 127.0 | 137.0 | 131.0 | 129.0 |
| Seal strength (g./in. seal) (Tappi T642) | ([3]) | ([3]) | ([3]) | ([3]) | 52 |
| Gloss, 45° (Tappi T480): | | | | | |
| Initial | 32 | 26 | 24 | 25 | 59 |
| 7 day | 29 | 24 | 22 | 24 | 59 |
| Moisture vapor transmission rate (g. H₂O/100 in.²/24 hr.): | | | | | |
| Flat (Tappi T464) | 1.6 | 1.6 | 1.6 | 2.0 | 2.27 |
| Creased (Tappi T465) | 2.0 | 1.7 | 1.7 | 2.5 | 4.12 |

[1] Sulfite. [2] Glassine. [3] Fiber tear.

From the above results it is apparent that hot melt formulations made from di-methyl alpha-methyl styrene/alpha-methyl styrene/styrene terpolymers in accordance with our invention provide excellent seal strength for coated papers and low moisture vapor transmission rates. Other uses for the formulations of our invention which take advantage of their adhesion and coating properties will be apparent to those skilled in this art.

Having thus described our invention, what we claim is:

1. A composition comprising, by weight, 0–90 percent of wax having a melting point in the range of about 125° F. to about 200° F., 5–80 percent of an ethylene/unsaturated ester copolymer selected from the group consisting of ethylene-vinyl acetate, ethylene-ethyl acrylate, and ethylene-isobutyl acrylate having an unsaturated ester content within the range of 10–50 mol percent, and 5–80 percent of a dimethyl alpha-methyl styrene/alpha-methyl styrene/styrene resin containing from about 10 to about 70 mol percent of each component monomer and having a ball and ring softening point within the range of 150° F. to 325° F.

2. The composition of claim 1 comprising 10–80 percent of said wax, 10–80 percent of an ethylene/vinyl acetate copolymer having a vinyl acetate content within the range of 20–40 mol percent, and a melt index within the range of 1.5–30 and 10–80 percent of a dimethyl alpha-methyl styrene/alpha-methyl styrene/styrene terpolymer resin containing from about 10 to about 70 mol percent of each component monomer and having a ball and ring softening point within the range of 175°–270° F.

3. The composition of claim 1 comprising 10–80 percent of said wax, 10–80 percent of an ethylene/ethyl acrylate copolymer having an ethyl acrylate content within the range of 20–40 mol percent, and a melt index within the range of 1.5–30 and 10–80 percent of a dimethyl alpha/methyl styrene/alpha-methyl styrene/styrene terpolymer resin containing from about 10 to about 70 mol percent of each component monomer and having a ball and ring softening point within the range of 175–270° F.

4. The composition of claim 1 comprising 10–80 percent of said wax, 10–80 percent of an ethylene/isobutyl acrylate copolymer having an isobutyl acrylate content within the range of 20–40 mol percent, and a melt index within the range of 1.5–30 and 10–80 percent of a dimethyl alpha-methyl styrene/alpha-methyl styrene/styrene terpolymer resin containing from about 10 to about 70 mol percent of each component monomer and having a ball and ring softening point within the range of 175–270° F.

5. The composition of claim 1 comprising about 5 to about 90 percent of said wax, about 10–80 percent of ethylene/vinyl acetate copolymer having a vinyl acetate content within the range of 20–40 mol percent and about 10–80 percent of dimethyl alpha-methyl styrene/alpha-methyl styrene/styrene resin containing each component in a mol ratio of about 1:1:1.

6. A paper coated with the composition of claim 1.

References Cited

UNITED STATES PATENTS

| | | |
|---|---|---|
| 3,275,494 | 9/1966 | Bruson. |
| 3,245,931 | 4/1966 | Matthew. |
| 3,294,722 | 12/1966 | Apikos. |
| 3,306,882 | 2/1967 | Pullen _____ 260—28.5 |

MORRIS LIEBMAN, *Primary Examiner.*

H. H. FLETCHER, *Assistant Examiner.*

U.S. Cl. X.R.

117—155; 260—897